US007992319B2

(12) United States Patent
Wilson

(10) Patent No.: US 7,992,319 B2
(45) Date of Patent: Aug. 9, 2011

(54) DRYER, DRYING METHOD AND DRYING PLANT

(75) Inventor: David Wilson, Newport (AU)

(73) Assignee: ECT Coldry Pty Ltd., Melbourne (AU)

( * ) Notice: Subject to any disclaimer, the term of this patent is extended or adjusted under 35 U.S.C. 154(b) by 540 days.

(21) Appl. No.: 10/573,057

(22) PCT Filed: Sep. 24, 2004

(86) PCT No.: PCT/AU2004/001319
§ 371 (c)(1),
(2), (4) Date: May 17, 2007

(87) PCT Pub. No.: WO2005/028977
PCT Pub. Date: Mar. 31, 2005

(65) Prior Publication Data
US 2007/0294911 A1   Dec. 27, 2007

(30) Foreign Application Priority Data
Sep. 25, 2003   (AU) .................... 2003905237

(51) Int. Cl.
*F26B 17/12* (2006.01)
(52) U.S. Cl. ............ 34/165; 34/167; 34/168; 34/169; 34/171; 34/178
(58) Field of Classification Search ............ 34/165, 34/167, 168, 169, 170, 171, 178
See application file for complete search history.

(56) References Cited

U.S. PATENT DOCUMENTS

| 618,508 | A | * | 1/1899 | Hess ........................ 34/65 |
| 912,322 | A | * | 2/1909 | Pietsch ..................... 34/175 |
| 1,482,812 | A | * | 2/1924 | Roberts .................... 34/174 |
| 2,078,515 | A |   | 4/1937 | Sutherland |
| 2,245,664 | A |   | 6/1941 | Gronet |
| 3,589,027 | A |   | 6/1971 | Duzan et al. |
| 4,157,314 | A | * | 6/1979 | Murty ...................... 502/425 |
| 4,242,806 | A | * | 1/1981 | McClaren ................. 34/394 |

(Continued)

FOREIGN PATENT DOCUMENTS
CA   1195108   10/1985
(Continued)

OTHER PUBLICATIONS

Wilson, David et al. *The Coldry Process*. AIE 7th Australian Coal Science Conference, Dec. 1996.
(Continued)

*Primary Examiner* — Kenneth Rinehart
*Assistant Examiner* — Corey J Hall
(74) *Attorney, Agent, or Firm* — Husch Blackwell LLP

(57) ABSTRACT

The invention provides a dryer for drying particulate material, comprising at least one substantially vertical elongate container having: an upper inlet for receiving a charge of moisture containing particulate material; a lower outlet for discharging dried particulate material, whereby the particulate material travels under the influence of gravity from the inlet to the outlet; at least one substantially vertical gas permeable wall through which a drying gas can pass to contact the particulate material; the dryer also comprising at least one plenum on an exterior surface of the at least one gas permeable wall, covering ingress and egress openings within the at least one gas permeable wall.

19 Claims, 6 Drawing Sheets

U.S. PATENT DOCUMENTS

| | | | |
|---|---|---|---|
| 4,337,584 A * | 7/1982 | Johnson | 34/65 |
| 4,412,840 A | 11/1983 | Goskel | |
| 4,619,606 A | 10/1986 | Numberger | |
| 5,233,766 A | 8/1993 | Frederiksen et al. | |
| 5,263,817 A * | 11/1993 | States | 425/331 |
| 5,671,804 A | 9/1997 | Kordelin | |
| 6,098,305 A | 8/2000 | Watson | |

FOREIGN PATENT DOCUMENTS

| | | | |
|---|---|---|---|
| GB | 947693 A | | 1/1964 |
| RU | 2204096 C1 | | 5/2003 |
| WO | WO 02/12811 A1 | | 2/2002 |
| WO | WO 03/001131 A1 * | | 1/2003 |

OTHER PUBLICATIONS

Pp. 320-329 in book Brown Coal by H. Herman published in 1952 by The State Electricity Commission of Victoria.

* cited by examiner

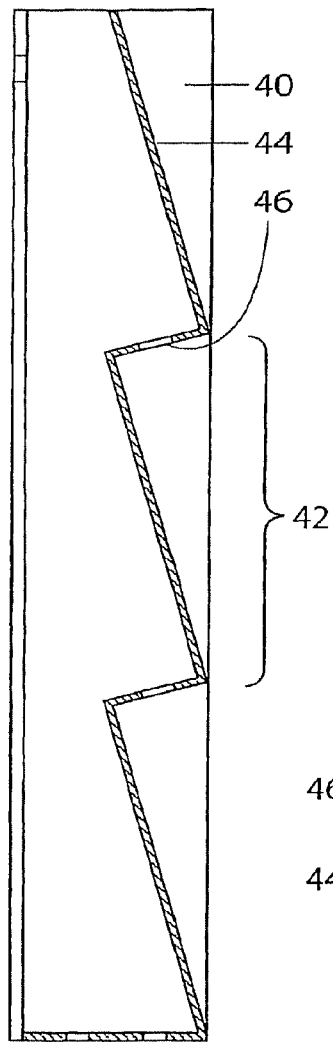
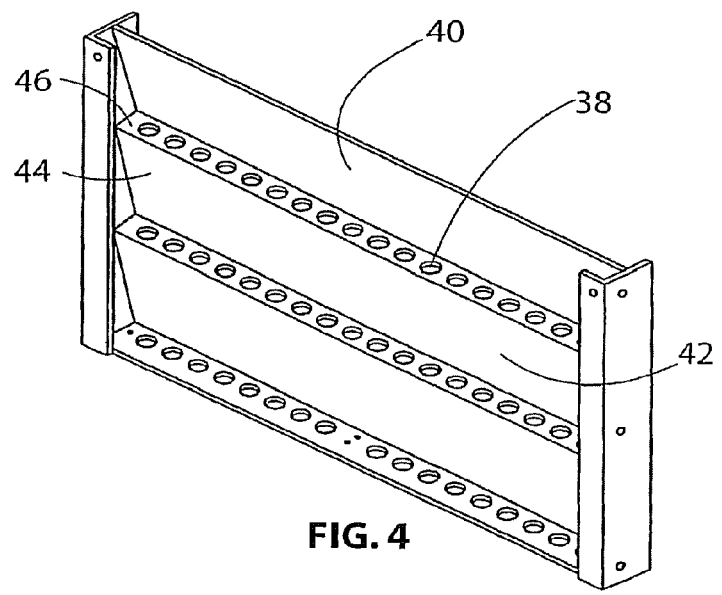
FIG. 5
FIG. 4

DRYER, DRYING METHOD AND DRYING PLANT

FIELD OF THE INVENTION

The present invention relates to a dryer, a drying method and a drying plant, each for use in drying particulate material. The invention particularly relates to a dryer, drying method and drying plant for use in drying pellets containing low rank carbonaceous material, such as brown coal, peat, certain soft lignites, anaerobically decomposed plant matter, or any combination thereof.

BACKGROUND OF THE INVENTION

Low rank carbonaceous materials, such as brown coal, are a basic energy source in many regions of the world. The use of such materials for the provision of energy is often convenient due to their abundant supply and location in the vicinity of energy requirements. However, as a result of high moisture content of such materials they are of relatively low energy value and have relatively high mass to energy content ratio. This means that it is often not economically viable to transport such materials far from where they are deposited and that unless deposits are located close to the surface they may not constitute a viable energy source. Furthermore, the high moisture content of such materials means that their combustion is not clean and gives rise to more unwanted combustion by-products than combustion of higher rank carbonaceous materials. There is therefore a need to develop efficient means for reducing the moisture content of such materials.

For example, Australian Patent Nos. 561,586 and 588,565 disclose processes for treating brown coal by subjecting the material, with or without the addition of water, to shearing forces to produce a plastic mass, from which pellets are formed by extrusion. The pellets are then subjected to a drying step using air at or near ambient temperature.

Earlier work by the present inventor, as disclosed in Australian Patent No. 636,847 has involved the use of brown coal containing pellets as feed for the production of char by pyrolysis or in the reduction of iron ore. Such pellets when first formed need to undergo air drying to remove a significant proportion of water before undergoing high temperature treatment. The drying must be performed slowly so as to not undermine the structural integrity of the pellets, and can take up to several days. Moreover, because the pellets have a relatively low intrinsic economic value, capital, handling and operating costs should be minimised. Furthermore, the large tonnages of the pellets required to be dried, are typically stored in open air heaps and adequate air circulation to all pellets during drying can be problematic.

Different approaches to the drying of granular or particulate materials have been disclosed in U.S. Pat. No. 5,233,766 and International Patent Publication Nos. WO97/25295 and WO2004/048868. U.S. Pat. No. 5,233,766 discloses a dryer having a substantially vertical chute with a top and a bottom and at least two walls with air-pervious containment means for containing granular material, allowing an air stream to pass through at least portions of the chute. WO97/25295 discloses a device for aerobic treatment, conditioning and/or drying of a moist substantially solid or paste-like material that has a vessel with paired Venetian-blind-like walls, preferably with adjustable blades, and having air inlet and discharge chambers. WO2004/048868, which was published on 10 Jun. 2004, discloses a continuous gravity flow apparatus for heating and/or drying particulate material that is vertically disposed and has a top and a bottom with a flow passage for the particulate material between cylindrical outer and inner housings that have perforated wall sections.

There is a need for a method, apparatus and plant for drying particulate materials, such as pellets comprising low rank carbonaceous materials, which overcome or at least alleviate one or more disadvantages of the prior art. It is in view of this background that the present invention has been conceived, which may offer advantages over prior art approaches in terms of efficiency of drying, structural integrity of product produced and minimisation of capital, handling and operating costs, for example.

SUMMARY OF THE INVENTION

According to one embodiment of the present invention, there is provided a dryer for drying particulate material, comprising at least one substantially vertical elongate container having:
 an open upper inlet for receiving a charge of moisture containing particulate material;
 an open lower outlet for discharging dried particulate material, whereby said particulate material travels under the influence of gravity from said inlet to said outlet in a substantially continuous manner;
 at least one substantially vertical gas permeable wall through which a drying gas can pass to contact said particulate material;
said dryer also comprising at least one plenum on an exterior surface of said at least one gas permeable wall, covering ingress and egress openings within said at least one gas permeable wall.

According to another embodiment of the present invention there is provided a dryer for drying particulate material, comprising at least one substantially vertical elongate container having:
 an upper inlet for receiving a charge of moisture containing particulate material;
 a lower outlet for discharging dried particulate material, whereby said particulate material travels under the influence of gravity from said inlet to said outlet;
 two substantially vertical and opposed gas permeable walls through which a drying gas can pass to contact said particulate material;
said dryer also comprising plenums on exterior surfaces of said gas permeable walls, covering ingress and egress openings within said gas permeable walls, wherein the plenums are divided into zones of differing air stream properties.

The present invention also provides a method of drying a particulate material using the dryer described in the preceding paragraph. Preferably the particulate material is pellets containing brown coal.

The present invention also provides a plant for drying a particulate material including the dryer described above.

According to another embodiment of the present invention there is provided a drying plant comprising:
 (a) a conditioning bed for subjecting moisture containing particulate material to surface conditioning;
 (b) at least one conveyer for conveying said surface conditioned material to an inlet of a dryer as described above;
 (c) a collection surface for retrieving dried particulate material from the dryer; and
 (d) a particulate material remover for removing dried particulate material from said collection surface.

The present invention further provides a drying cell for use in the dryer described above.

According to a further embodiment of the present invention there is provided a dryer for drying pellets of brown coal comprising at least one substantially vertical elongate container having:

- an open upper inlet for receiving a charge of brown coal containing pellets;
- an open lower outlet for discharging dried pellets of brown coal, whereby said pellets travel under the influence of gravity from said inlet to said outlet in a substantially continuous manner;
- two opposing substantially vertical gas permeable walls through which a drying gas can pass to contact said pellets;

said dryer also comprising plenums on external surfaces of the gas permeable walls covering ingress and egress openings within the gas permeable walls, wherein the plenums are divided into zones of differing air stream properties and wherein the direction of drying gas flow through the charge of brown coal containing pellets is reversed from one plenum zone to an adjacent plenum zone; the dryer comprising lateral internal membrane walls joining opposing gas permeable walls that divide the dryer into a plurality of adjacent cells.

BRIEF DESCRIPTION OF THE FIGURES

The invention will be described by way of example only, with reference to the drawings, wherein:

FIG. 4 is a perspective view of a segment of louvred wall for use in the construction of a dryer in accordance with the invention;

FIG. 5 is a cross-section of the segment of louvred wall shown in FIG. 4;

DETAILED DESCRIPTION OF THE INVENTION

Figure 1:
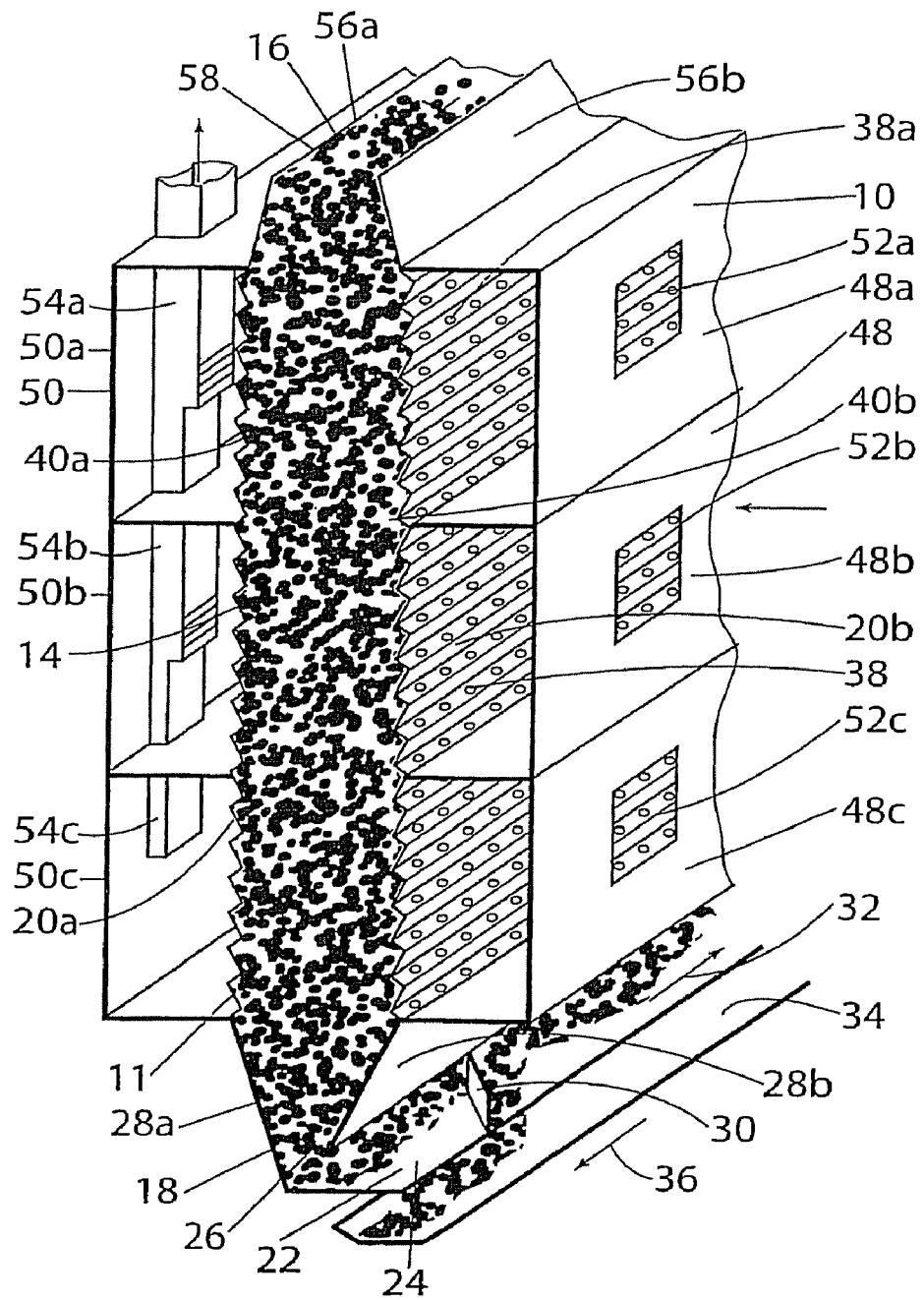
FIG. 1 is a perspective view of a first embodiment of a dryer according to the invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia.

The dryer of the present invention includes at least one substantially vertically orientated elongate container having an upper inlet, for receiving the charge of moisture containing particulate material, and a lower outlet for discharging the particulate material after drying. The inlet and outlet are typically open to allow for substantially continuous throughput of the particulate material.

Typically, the dryer does not require inlet or outlet flow control valves. The outlet is preferably spaced a predetermined distance from a collection surface. Typically, the outlet is vertically spaced above the collection surface. Preferably the dried material leaving the outlet discharges under the influence of gravity onto the collection surface, such as an apron, and the flow of the particulate material stops once the mound of material collected on the surface achieves its natural angle of repose. At this stage, some or all of the mound of material can be removed, either manually or preferably automatically (such as by using a travelling scraper) which allows more material to flow from the outlet until the natural angle of repose is again achieved. Preferably, the feed of moisture containing particulate material to the upper inlet is controlled so as to keep the level of particulate material approximately constant as it is removed from the outlet. Preferably the rate of material fed into the upper inlet will approximate the rate of material passing from the lower outlet, with inflow and outflow rates being adjustable depending on the desired residence time of the material within the dryer. Desirable residence times can range between about 3 hours and about 4 weeks, preferably between about 6 hours and about two weeks, more preferably between about 12 hours and about 4 days and most preferably between about 24 hours and about 72 hours, such as about 48 hours, for example. The desired residence time can be determined based upon a number of factors including the nature of the particulate material, the moisture content of the material, the intended end use of the material, the temperature, humidity and rate of flow of drying gas and the ambient temperature, pressure and wind conditions. Processing conditions within the dryer can be standardised at least to some extent by housing the dryer in an environment where it is protected to some extent from fluctuations in weather conditions.

The dryer of the invention also includes at least one substantially vertical gas permeable wall through which a drying gas can pass to contact, and dry, the particulate material. Preferably, the dryer includes at least two opposed, substantially vertical permeable walls. Depending on the nature of the particulate material, the walls may advantageously be at a slight angle to the vertical such that the cross-sectional interior area of the container increases from its top to its bottom. Such an arrangement is preferred where the particulate material does not shrink upon drying because it minimises or prevents "bridging" of the material and consequential obstruction of material flow. However, angled vertical walls may not be necessary where the particulate material comprises low rank carbonaceous material, because such material shrinks upon drying and the bridging effect is minimised.

The at least one gas permeable wall preferably includes a plurality of openings therethrough. The openings are preferably of a size such that the drying gas is able to pass into and out of the container but such that the particulate material cannot pass through the openings. The following discussion will focus on the use of air as the drying gas, however, it is to be understood that other suitable gases (for example, $CO_2$, $N_2$, etc. which may be derived from combustion waste gases) could instead be used. Preferably the drying gas is either directly derived from another industrial process that produces suitable gas or is recycled from earlier use in the dryer or from use in another section of the drying plant. If using recycled drying gas it is preferred to incorporate a desiccator or refrigerator within the gas flow after exit from the air outlet to de-humidify the gas. This is also a convenient way of recovering water that may then be put to another use. In the case where the drying gas is heated above ambient temperature this will preferably be achieved using waste heat from another industrial process.

Preferably, the or each permeable wall includes a plurality of vertically spaced, substantially horizontally orientated slats, such that the drying gas (eg. air), but not the particulate material, is able to pass through the openings between the slats. More preferably, each slat is joined to adjacent slats at intervals along its length in order to improve the mechanical strength of the permeable wall. More preferably, each permeable wall comprises a plurality of vertically spaced, horizontally orientated louvres having openings therebetween.

More preferably each permeable wall comprises a substantially continuous corrugated plate, wherein each corrugation comprises a supporting leg and a permeable leg angled with respect to each other. The supporting leg bears most of the load of the particulate material inside the container. The permeable leg has openings therethrough for ingress and egress of gas and joins adjacent supporting legs.

Preferably, the supporting and permeable legs are arranged at an angle of about 90° to each other. More preferably, the supporting legs are wider than the permeable legs.

In use, air passes into the container via gaseous ingress openings in the at least one permeable wall, through the charge of particulate material and exits through egress gaseous openings in at least one permeable wall. In one embodiment, the ingress openings and egress openings are respectively provided in opposed permeable walls.

Preferably air is sucked into the container typically under the influence of an induced fan. The induced fan is typically positioned downstream of the egress openings. One or more air plenums may be provided on the exterior surface of the permeable walls and these preferably cover the egress openings. Air plenums allow the physical properties of the air, such as flow rate, temperature, pressure, etc. to be controlled. Preferably, one or more air plenums also cover the ingress openings. The, or each, air plenum covering the ingress gaseous openings typically includes at least one air inlet and the, or each, air plenum covering the egress openings typically includes at least one outlet. Preferably the at least one outlet includes one or more air extract ducts. Preferably air is drawn into the inlets under action of an air circulator, such as an induced draft fan. Advantageously, the air stream is at ambient or higher temperature. Preferably the air temperature is between about 15.degree. C. and about 80.degree. C., more preferably between about 25.degree. C. and about 60.degree. C. Preferably the, or each, inlet air plenum is provided on the exterior of one permeable wall and the, or each, outlet air plenum is provided on the exterior of an opposing permeable wall, such that the air stream passes through the full thickness of the particulate charge, thereby maximising surface area contact of the charge with the air stream. For most embodiments, adequate air flow through the particulate charge is achieved by suction, such as by using an induced fan as described above. However, under some circumstances, it can be advantageous to force air into the ingress openings under pressure. Such circumstances include the situation where external air is leaking into the particulate charge, for example at the open, upper inlet. External leakage from the atmosphere can be avoided when the pressure of air being fed into the ingress openings is substantially equal to or higher than atmospheric.

The, or each, plenum may be sub-divided into a number of zones of differing air stream properties—such as velocity, direction of flow, temperature or pressure. The, or each, plenum may be subdivided horizontally, with the volume of each successive zone increasing from the top of the container to the bottom. Such an arrangement may be advantageous where the cross-sectional interior area of the container increases from the top to the bottom, as it allows a successively higher flow rate of air to be introduced to the charge to accommodate the increasing bulk of charge going from the top to the bottom.

In an alternative embodiment, the direction of air flow through the particulate charge may be reversed from one plenum zone to an adjacent plenum zone. This may be achieved by providing an air circulator in alternate plenum zones, such that air is sucked in a first direction from one plenum zone, through the charge into an opposing plenum zone, then into an adjacent plenum zone and back through the charge in a second, reverse direction, and so on. In this manner, the air flow path "zig-zags" back and forth throughout the height of the charge. The dryer may have one or more air flow paths, but preferably has only a single air flow path with a single air inlet and a single air outlet. Air exiting the dryer through the air outlet may be passed through a desiccator or refrigerator to recover moisture removed from the particulate charge. The air exiting the dryer is preferably passed through a heat exchanger (preferably using waste heat from another industrial process) to preheat it before being recycled back to the air inlet of the dryer.

The height of the dryer is typically significantly greater than its width. Typically, the ratio of height:width is greater than 2:1, preferably at least 3:1, and can be as high as about 5:1. However, in some embodiments the ratio may exceed 5:1, such as 10:1 or 15:1. A relatively high ratio of height:width has the advantage of reducing the air path through the dryer (from one side of the dryer to the other) and lowers the resulting air pressure drop. The high ratio also minimises leakage of air into the dryer through the open inlet or outlet at the top and bottom, respectively. In one embodiment of the invention the dryer is 7.5 m high and 2.5 m wide, whereas in another embodiment the dryer is 12 m high and 1.2 m wide.

The container wall/s are preferably tapered inwardly towards the inlet and outlet. A tapered outlet assists in controlling the rate of discharge of the dried material. A tapered inlet enables the top of the bed of particulate material to form a mound. Preferably, the distance from the apex of the mound of particulate material to the uppermost gaseous openings is greater than the width of the particulate bed. Such a relationship enhances the effective ingress and egress of air through the gaseous openings rather than by leakage from the atmosphere through the open top of the dryer. Leakage of air through the top of the particulate bed can be further reduced by biasing the pellet feed towards the air outlet side of the dryer. Preferably also particulate material being fed into the dryer does not need to drop more than about 3 meters, preferably not more than about 1 meter, to the apex of the mound of particulate material within the dryer. In this way fracturing and disintegration of the particulate material entering the dryer will be minimised.

Where the dryer of the present invention is to be used to dry large volumes of particulate material, the structure of the dryer preferably includes lateral reinforcement. Such a structure typically includes lateral supporting members joining opposing permeable walls. The supporting members may comprise one or more internally disposed struts laterally spaced along and joining the opposed permeable walls. However, where the dimensions of the dryer are significantly high, the supporting members are preferably one or more internal membrane walls which extend partly or along substantially the entire height and width of the container and effectively subdivide the interior volume of the container into two or more cells.

In a particularly preferred embodiment of the dryer, for use in an industrial application, the dryer comprises a plurality of adjacent cells, which are separated at substantially regular intervals by internal membrane walls. Each membrane wall extends the entire height and width of the dryer, so as to effectively isolate the interior of each cell from each other. These membrane walls provide lateral support for the dryer and thereby enhance the overall mechanical strength of the dryer, as well as serving to segment the air flow paths within the drier.

The construction of an industrial scale dryer described above is advantageously effected by the assembly together of a number of unit cells of predetermined dimensions. Each unit cell typically includes two opposing louvred walls, which are preferably substantially vertical, with their respective bases and/or tops being angled towards each other, and two opposing membrane walls, joining together the respective lateral sides of the louvred walls. Typically, adjacent unit cells share a common membrane wall. The unit cells are preferably assembled together into a support structure such as a structural module to enable the positioning of the assembly in the desired orientation and height from ground level.

The present invention also extends to a drying plant including the dryer described above. The drying plant is particularly adapted to producing dried, low rank carbonaceous material (especially brown coal) containing pellets and the following discussion will focus on that application. However, it is to be understood that the drying plant is not restricted to that application.

The drying plant includes:
- a conditioning bed for subjecting brown coal containing pellets to surface conditioning and maturing to improve fracture resistance;
- conveyors for conveying the surface conditioned brown coal containing pellets to an inlet of a dryer according to the present invention;
- a collection surface for receiving dried pellets from the outlet of the dryer, said collection surface being positioned so as to allow said dried pellets to be collected, and to form a mound having a natural angle of repose;
- a pellet remover for removing said pellets from said collection surface.

The drying plant typically also includes a compactor for the production of brown coal containing compacted bodies. The compactor may comprise any suitable means by which the brown coal is formed into compacted bodies. Typically the compactor will include a mixing/attritioning device and a pelletiser, preferably an extruder. The brown coal, preferably in the form of fines (for example having average particle diameter of about 0.5 mm to about 10 mm, preferably about 2 mm to about 6 mm) is mixed, if necessary, with water, binders and any other components (for example, metal containing material such as iron oxide waste). In the course of this mixing the coal is exposed to shear forces that not only result in attritioning of the coal particles, but also result in generation of a plastic mass of material that is then fed to the extruder, where it is formed into pellets of the desired size.

The mixing/attritioning is generally conducted for between about 30 sec and about 2 hours, preferably for between about 1 min and about 30 min, most preferably between about 2 min and about 5 min, which should be sufficient to allow visible sign of "balling" of the coal to occur. The shear forces applied to the coal should be sufficient to cause water to be released from the cellular structure of the coal. For example a sigma-type kneading machine operating at low speed (eg. 20-40 r.p.m) and having a rotor-wall clearance of 0.3 mm can usefully be adopted. The preferred mixing/attritioning action is a relatively slow kneading action, rather than a fast beating action, that will result in the shearing of one newly exposed face of the coal material against another. Within the compactor and following mixing/attritioning the plastic mass of coal material will be extracted by a suitably located discharge screw or screws that feeds the moist attritioned coal to an extrusion head designed to impart the required extrusion pressure to form pellets sufficiently firm to withstand reasonable load immediately following their formation. The extrusion pressure applied will depend upon the nature of the coal material and its moisture content, but may vary between about 5 bar up to more than 50 bar, preferably between about 8 bar and about 35 bar and most preferably between about 15 bar to about 25 bar, using a single screw extruder. Use of a twin screw extruder allows higher extrusion pressures to be applied.

Using the preferred low pressure screw extrusion a coal moisture content of between about 50% w/w and 70% w/w is preferred, although the desirable moisture content for extrusion will vary depending upon the nature of the coal. For Maddingley brown coal (from the Maddingley open cut mine at Bacchus Marsh, Victoria, Australia) the moisture content for extrusion is preferably 55% w/v to 65% w/w. It is of course far easier and less costly to add water, if required, than to remove water. When a coal has a higher moisture content than the desired level, the situation can be cheaply and easily rectified by recirculating dried coal fines into the plastic mass of coal material.

The pellets thus formed typically have a moist surface that can be problematic in that the pellets will tend to stick together, if fed directly into the dryer of the invention. Accordingly, it is desirable to condition the pellets first. Conditioning is preferably effected by subjecting the pellets to surface drying, thus allowing the bonding/shrinking reaction to proceed to an extent that allows the pellets to withstand subsequent handling and drying operations, without undue fracturing or disintegration. Preferably, the moist pellets are disposed onto a conditioning bed and are subjected to heat, typically by being blown with preheated air. More preferably, the pellets are loaded onto a permeable surface, which allows the preheated air to be circulated freely about the pellets. The permeable surface is preferably a mesh conveyor belt, such as a polymeric or stainless steel mesh belt, which passes over one or more open topped chambers into which preheated air is blown. The preheated air may be provided by heat exchangers adjacent the open topped chambers, with air fed thereto by one or more fans. Typically the heat exchangers are heated using hot water, such as by using waste heat from steam turbine condensate (for example from power generation equipment), preferably at a temperature of at least 50° C. and more preferably at temperatures of at least 80° C. or at least 120° C. This will serve to warm the ambient air to which the pellets are exposed preferably to between about 20° C. to about 60° C. Preferably pellets are at depths of between about 30mm to about 200mm on the conditioning bed and are subject to conditioning for between about 10 mins and about 4 hours, preferably between about 15 mins and about 150 mins and most preferably between about 25 mins and about 50 mins.

After conditioning, the pellets are then fed to the inlet of the dryer of the invention. Where conditioning occurred on a mesh conveyor belt, the conveyor belt may transfer the conditioned pellets directly or indirectly (e.g. via one or more transfer conveyors) to the dryer inlet. It is preferred that the pellets are evenly distributed along the length of the inlet opening, such that the bed of pellets in the dryer is of substantially even depth. To achieve this, a shuttle conveyor may be employed to feed the conditioned pellets to the opening, with the period of travel extending substantially along the entire length of the pellet bed. Typically, the top of the bed of pellets forms into a mound. It is advantageous to bias the pellet feed such that the apex of the mound is closer to the gaseous outlet side than the inlet side of the dryer.

The drying plant further includes a collection surface located so as to receive the dried pellets discharged from the dryer outlet. Dried pellets discharged from the dryer outlet accumulate and form a mound on the collection surface until the natural angle of repose is achieved, at which time further flow from the outlet is essentially prevented. Typically the collection surface is an apron extending along the entire length of the outlet of the dryer. The collection surface may be stationary with respect to the dryer, or moving, but is preferably stationary.

A removal means co-operates with the collection surface for removal of dried pellets as they are discharged, thereby allowing further discharge of pellets to the collection surface until the angle of repose is again attained. The removal means is arranged such that there is relative movement between it and the collection surface. The removal means is preferably adapted to travel along the length of the collection surface. It preferably comprises a blade or a scraper positioned to contact the pellets and push them off the collection surface for collection or transfer. In order to facilitate this action, the collection surface may be sloped in a direction away from the outlet.

The pellets thus removed may be collected on a moving conveyor, which transfers them to storage or as feed to another process. In this embodiment the discharge scraper typically moves along the collection surface in a direction opposite to the direction of travel of the moving conveyor.

Referring to FIG. 1, a dryer 10 for drying particulate material 11, in this case pellets of brown coal, is illustrated. The dryer 10 includes a substantially vertical elongate container 14 having an upper open inlet 16, for receiving the particulate material 11, and a lower outlet 18 through which said particulate material 11 is discharged after drying. The particulate material 11 travels from the inlet 16 to the outlet 18 under the influence of gravity. The dryer 10 also includes two, opposed gas permeable substantially vertical walls, 20*a* and 20*b*, through which a drying gas, in this case air, can pass in order to dry the particulate material 11.

The outlet 18 is formed by a gap between the converging lower extensions 28*a* and 28*b* of the gas permeable walls 20*a* and 20*b*, respectively. The converging lower extension 28*a* is longer than lower extension 28*b*, meaning that the outlet 18 opens slightly laterally of the dryer 10.

Figure 2:
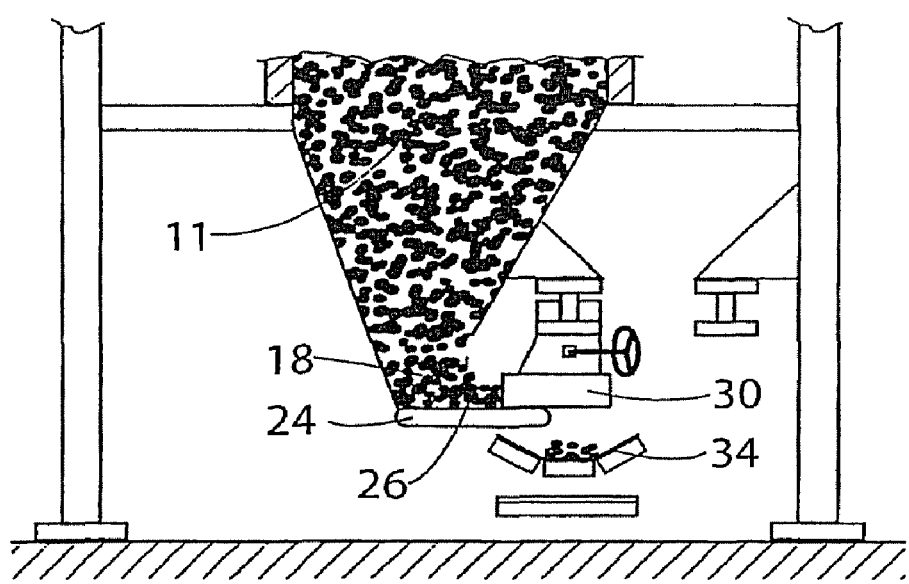
FIG. 2 is a partial cross-section of the lower part of the dryer of FIG. 1.

A collection surface 22 is positioned so as to receive the dried particulate material 11 as it is discharged from the outlet 18. In the embodiment shown in FIGS. 1 and 2, the collection surface 22 comprises an apron 24 extending in a substantially horizontal direction from the lower extension 28*a*. The apron 24 is contiguous with the lower extension 28*a* and together they define one lateral extent of the discharged material 11. The other lateral extent is determined by the natural angle of repose of the mound 26 formed on the apron 24 as the material 11 is discharged under gravity. The flow of particulate material 11 substantially stops once the natural angle of repose is attained. The dried particulate material can be regularly removed from the mound 26 using a removal means in this case comprising a travelling scraper 30. The arrow 32 shows the direction of movement of the scraper 30 along the apron 24. Particulate material removed by the scraper 30 is collected onto a moving conveyor 34 travelling in a direction indicated by arrow 36. As particulate material is removed from the mound 26, more dried particulate material 11 is able to flow from the outlet 18 until the natural angle of repose is again achieved. Preferably, the feed of moisture containing particulate material 11 to the inlet 16 is controlled so as to keep the level of particulate material 11 in the dryer 10 substantially constant as it is removed from the apron 24.

As previously stated, the dryer 10 includes two substantially vertical permeable walls 20*a* and 20*b*. As illustrated in FIG. 1, the walls 20*a* and 20*b* are both substantially vertical, given that the particulate material in the dryer shrinks upon drying, thereby avoiding "bridging" within the dryer 10 and consequent obstruction of material flow. However, if the particulate material were of some other composition which did not shrink upon drying, it may be beneficial to arrange the walls 20*a* and 20*b* such that they are orientated at a slight angle to vertical with the walls closer together at the tops than at the bases of the permeable sections.

Each gas permeable wall 20*a* and 20*b* includes a plurality of openings 38 therethrough. Each opening 38 is of a size such as to allow drying gas (in this case air) therethrough, but each opening 38 is preferably oriented or sized so as to substantially prevent passage therethrough of the particulate material.

Each gas permeable wall 20*a* and 20*b* comprises a substantially continuous corrugated plate 40*a* and 40*b*, respectively. FIGS. 4 and 5 show a perspective view and a cross-section, respectively, of a section of corrugated plate 40 in greater detail. Each corrugation 42 comprises a wider, supporting leg 44 and a narrower, permeable leg 46, wherein the angle between the supporting and permeable legs is approximately 90°. As shown in FIG. 5, the supporting leg 44 makes an angle of about 14.3° with the vertical. The supporting legs 44 bear the majority of the load of the particulate material. The permeable legs 46 include a plurality of openings 38 therethrough, which in this case comprise a single row of evenly spaced openings 38 along the length of each permeable leg 46.

On the exterior surfaces of the permeable walls 20*a* and 20*b* are provided air plenums 50 and 48, respectively, which are divided into air plenum zones 48*a*, 48*b*, 48*c*, 50*a*, 50*b*, 50*c*. Inlet air plenum zones 48*a*, *b* and *c* are provided on permeable wall 20*b*. Each of plenum zones 48*a*, *b* and *c* include an inlet vent 52*a*, *b* and *c*, respectively through which the drying gas, in this case preheated air, is admitted. The admitted air is sucked into the ingress openings 38*a* under action of an induced draft fan (not shown).

On the other side of the dryer 10, outlet plenums are provided comprising outlet air plenum zones 50*a*, *b* and *c*. Each outlet air plenum zone 50*a*,*b*,*c* includes an extract duct 54*a*, *b*,*c*, respectively, through which the drying air is extracted after use. The extract ducts 54*a*,*b*,*c* are all connected to an induced draft fan (not shown), which draws drying air into the inlet plenum zones 48*a*, *b* and *c*, through the particulate charge 11 to the outlet plenum zones 50*a*, *b* and *c*, which is then exhausted through the extract ducts 54*a*, *b* and *c*.

The inlet 16 is defined by a gap between the converging upper extensions 56*a* and 56*b* of the gas permeable walls 20*a* and 20*b*, respectively. The tapered nature of the upper extensions 56*a* and *b* leading to inlet 16 enables the top of the bed of particulate material to form into a mound. The distance from the apex of the mound 58 to the uppermost gaseous openings 38*a* is preferably greater than the width of the particulate bed.

Figure 3:
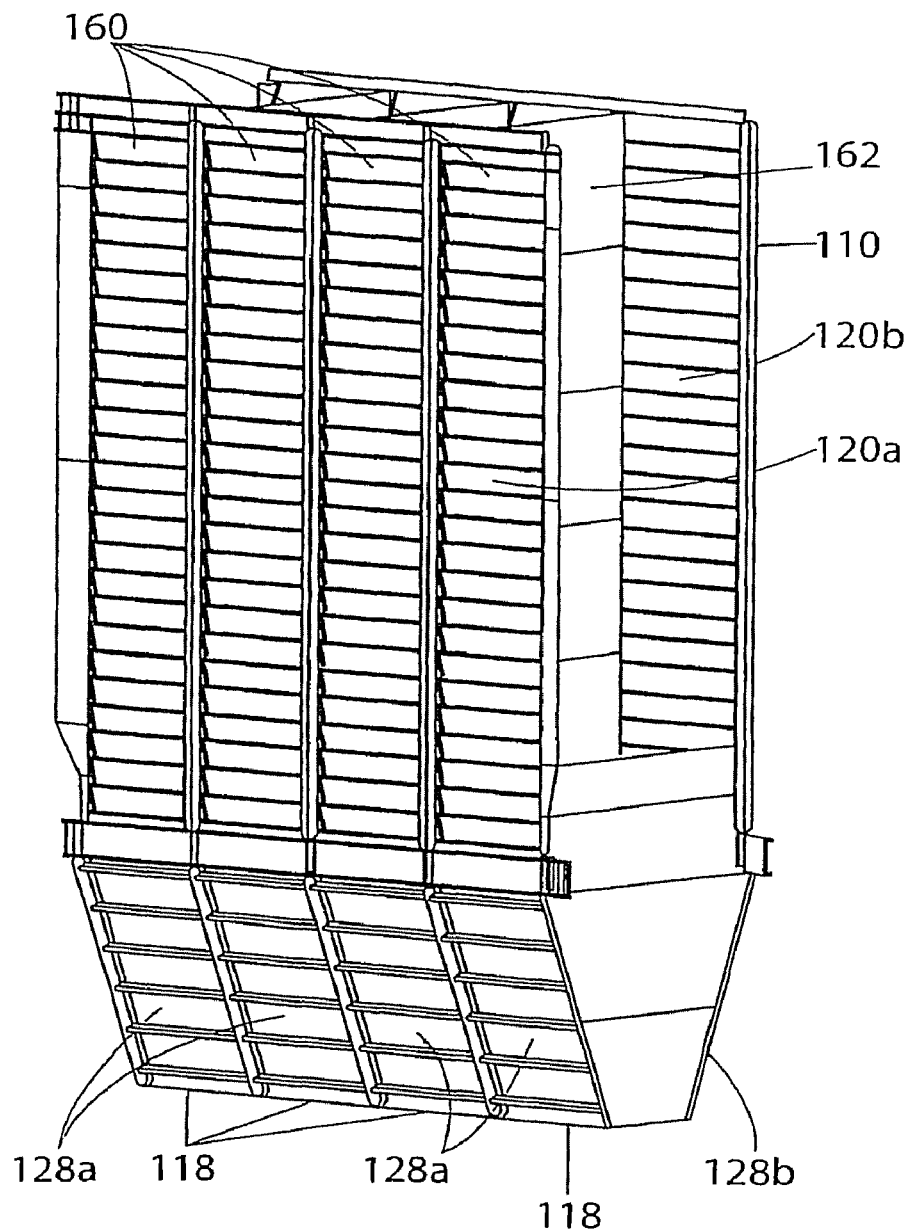
FIG. 3 is a perspective view of a second embodiment according to the invention comprising a series of dryer cells.

FIG. 3 illustrates a second embodiment of a dryer 110 of the invention which comprises a series of adjacent dryer unit cells 160, which are separated at substantially regular intervals by internal membrane walls 162. Each unit cell 160 includes two opposed louvred walls 120*a* and 120*b* having the same basic construction as shown in FIGS. 4 and 5. These walls have converging lower extensions 128*a* and 128*b*, which are tapered towards an outlet 118. Each membrane wall 162 extends the entire height and width of the dryer such as to effectively isolate the interior of each cell 160 from each other. Adjacent unit cells 160 share a common membrane wall 162.

Figure 6A:
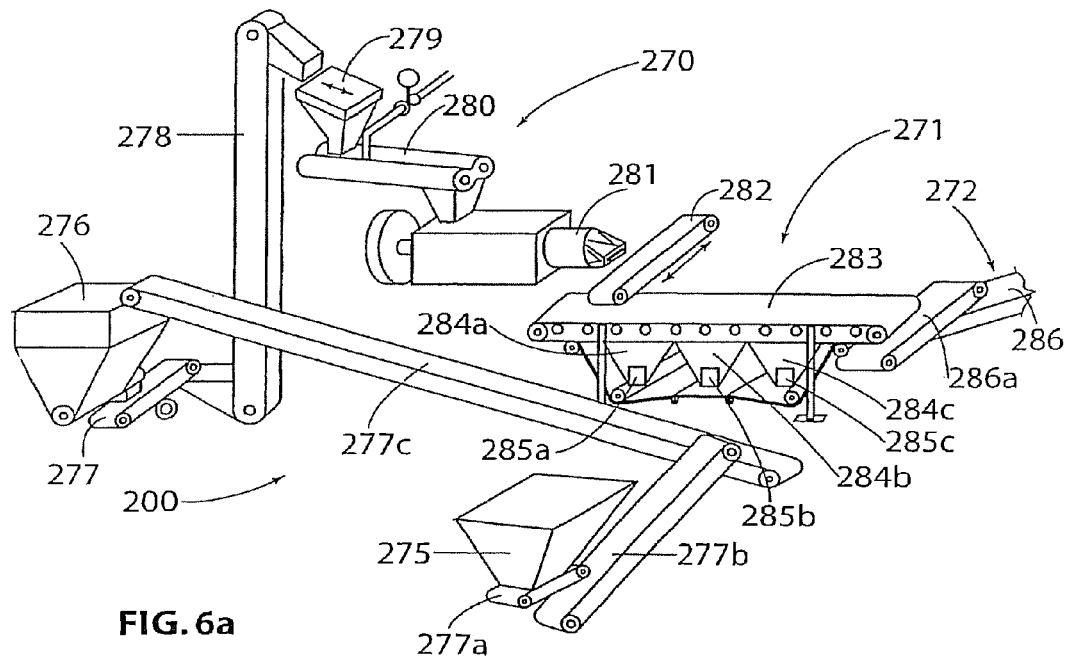
FIGS. 6a and 6b are schematic drawings of a drying plant in accordance with the invention.
Figure 6B:
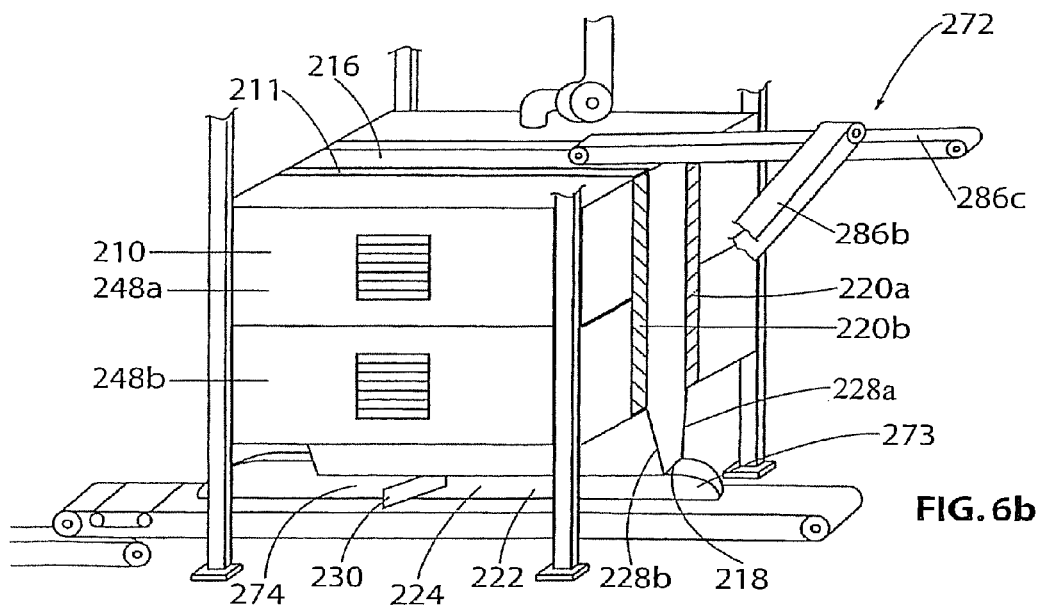

FIGS. 6*a* and 6*b* together illustrate a drying plant 200 incorporating the dryer 210 of the invention. The plant 200 also includes a compactor, indicated generally by the reference numeral 270, a conditioning bed, indicated generally at 271, a conveyor indicated generally at 272, discharger 273 and pellet remover 274.

Referring to FIG. 6*a*, a coal hopper 275 feeds brown coal to a coal surge hopper 276 via various conveyors 277*a, b* and *c*. The coal is discharged from the coal surge hopper 276 onto a weigh belt 277 from which it is fed to a bucket elevator 278. The coal is then screened on vibrating screen 279 and the fine fraction fed to a compactor 270 comprising a twin screw mixer 280 (where water is added to form a brown coal-water mixture) and an extruder 281, where the material is extruded as pellets onto an oscillating conveyor 282, from which the pellets are conveyed to the conditioner 271.

The conditioner 271 includes a conditioning belt comprising a stainless steel mesh conveyor belt 283 which passes over a plurality of open topped chambers 284*a*, 284*b* and 284*c* into which preheated air is blown. Each of chambers 284*a, b* and *c* are hopper shaped and include clean out doors 285*a,b* and *c*, respectively. The oscillating conveyor 282 ensures that pellets are evenly distributed across the width of the conditioning belt 283 so that even surface drying of the pellets is enabled.

After conditioning, the pellets are transferred to the dryer 210 via conveyor 272 comprising various intermediate conveyors 286*a*, 286*b* and 286*c*. The features and operation of the dryer 210, the discharger 273 and pellet remover 274 are substantially the same as the corresponding features in FIGS. 1 and 2, where like reference numerals refer to like parts.

Figure 7:
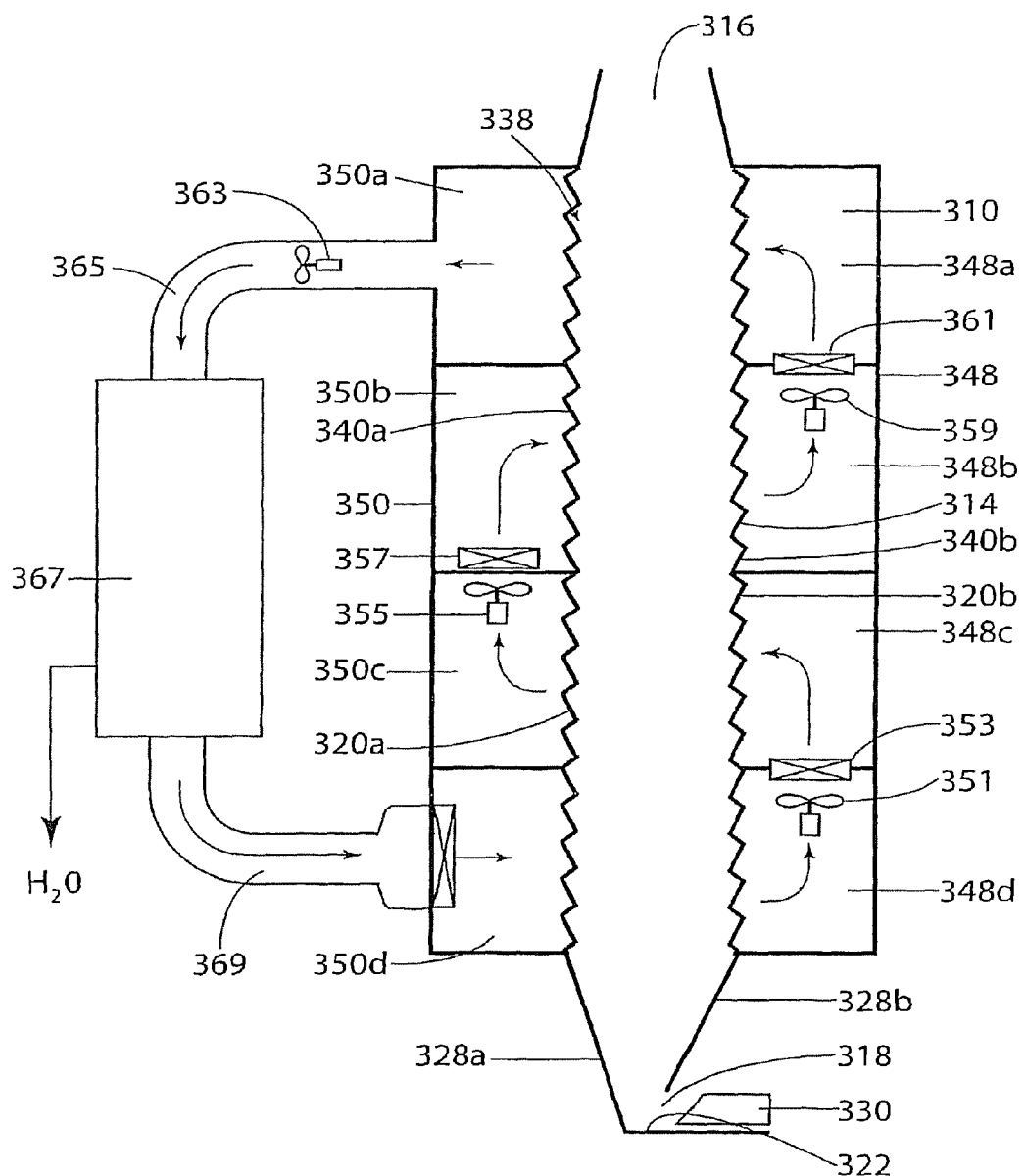
FIG. 7 is a schematic drawing of a third embodiment of a dryer of the invention.

A third embodiment of the dryer of the invention is shown generally at 310 in FIG. 7, in which like reference numerals relate to like parts. Discussion of FIG. 7 will focus on those features that differ from the embodiment shown in FIG. 1. The dryer 310 includes air plenums 348 and 350 provided on the surfaces of the permeable walls 320*b* and 320*a*, respectively. The air plenums 348 and 350 are divided into air plenum zones 348*a, b, c* and *d* and 350*a, b, c* and *d*, respectively. The drying gas, comprising preheated air, is sucked into plenum zone 350*d* and through the elongate container 314 into the opposing plenum zone 348*d*, by virtue of an air circulation means, comprising a fan 351 located in the opposing plenum zone 348*d*. An opening 353 between adjacent plenum zones 348*d* and 348*c* allows the air stream to be sucked into plenum zone 348*c* under action of a second fan 355 located in plenum zone 350*c*. The air stream therefore travels from plenum zone 348*c*, through the container 314 into the opposing plenum zone 350*c*. From there, the air stream travels through another opening 357 between adjacent plenum zones 350*c* and 350*b* and back through the container 314 into plenum zone 348*b* under action of a third fan 359. The air stream is then sucked into adjacent plenum zone 348*a* through opening 361, back through the container 314 and into opposing air plenum zone 350*a* under suction created by a fourth fan 363. Used air entering the plenum zone 350*a* exits via a conduit 365 and enters a desiccator 367 where moisture removed from the particulate charge (not shown) is removed. Heated air leaves the desiccator and is recycled back via conduit 369 to the plenum zone 350*d*, where it is again circulated through the other plenum zones and container.

Finally, it is to be understood that various alterations, modifications and/or additions may be introduced into the constructions and arrangements of parts previously described without departing from the spirit or ambit of the invention.

The invention claimed is:

1. A dryer for drying pellets containing brown coal, comprising at least one substantially vertical elongate container having:
    an open upper inlet for receiving a charge of moisture and brown coal containing pellets;
    an open lower outlet for discharging dried brown coal containing pellets, whereby said pellets travel under the influence of gravity from said open upper inlet to said open lower outlet in a substantially continuous manner;
    two substantially vertical and opposed gas permeable walls through which a drying gas at temperatures from about 15° C. to about 80° C. can pass to contact said pellets;
    wherein the gas permeable walls comprise a substantially continuous corrugated plate, wherein each corrugation comprises a generally vertically oriented impervious supporting leg and an adjacent generally horizontally oriented permeable leg angled with respect to each other, the permeable leg having spaced openings for the passage of the drying gas;
said dryer also comprising at least a first and a second plenums on exterior surfaces of said gas permeable walls, wherein the plenums are divided into zones of differing air stream properties, said air stream properties selected from the properties consisting of velocity, and pressure, said first and second plenums being connected to allow the recycling of the drying gas.

2. The dryer according to claim 1 wherein ingress openings and egress openings are respectively provided within said gas permeable walls.

3. The dryer according to claim 2 wherein a plenum covering said ingress openings comprises at least one inlet and a plenum covering egress openings comprises at least one outlet.

4. The dryer according to claim 3 wherein the at least one outlet comprises at least one extract duct.

5. The dryer according to claim 3 wherein drying gas is drawn into the at least one inlet by a circulator.

6. The dryer according to claim 5 wherein the circulator is an induced draft fan.

7. The dryer according to claim 3 wherein a desiccator or refrigerator is provided in conjunction with the at least one outlet to recover water from drying gas exiting the dryer.

8. The dryer according to claim 1 wherein the direction of drying gas flow through the charge of pellets is reversed from one plenum zone to an adjacent plenum zone.

9. The dryer according to claim 1 having a height to width ratio of at least 3:1.

10. The dryer according to claim 1 having a height to width ratio of at least 5:1.

11. The dryer according to claim 1 having a height to width ratio of at least 10:1.

12. The dryer according to claim 1 comprising lateral supporting members joining opposing gas permeable walls; wherein the supporting members are internal membrane walls that divide the dryer into a plurality of adjacent cells.

13. A drying plant comprising:
    (a) a conditioning bed for subjecting moisture and brown coal containing pellets to surface conditioning;
    (b) at least one conveyer for conveying said surface conditioned brown coal containing pellets to the open upper inlet of a dryer according to claim 1;
    (c) a collection surface for retrieving dried pellets from the dryer; and
    (d) a pellet remover for removing dried pellets from said collection surface.

14. The drying plant according to claim 13 further comprising a compactor for production of brown coal containing compacted bodies.

15. The drying plant according to claim 14 wherein the compactor comprises a mixing and conditioning device and a pelletizer.

16. A method of drying brown coal which comprises introducing brown coal fines into the compactor of the drying plant according to claim 14.

17. The dryer according to claim 1, wherein said plenums are located external to said substantially vertical elongate container.

18. A dryer for drying pellets containing brown coal comprising at least one substantially vertical elongate container having:
- an open upper inlet for receiving a charge of brown coal pellets;
- an open lower outlet for discharging dried pellets, whereby said pellets travel under the influence of gravity from said inlet to said outlet in a substantially continuous manner;
- two opposing substantially vertical gas permeable walls through which a drying gas at temperatures of from about 15° C. to about 80° C. can pass to contact said pellets;
- wherein the gas permeable walls comprise a substantially continuous corrugated plate, wherein each corrugation comprises an impermeable supporting leg adjacent a permeable leg and angled with respect to each other, said supporting leg being substantially vertical, said permeable leg being substantially horizontal with spaced openings;
- said dryer also comprising plenums on external surfaces of the gas permeable walls, wherein the plenums are divided into at least a first and second zone of differing air stream properties and wherein the direction of drying gas flow through the charge of brown coal containing pellets is reversed from one plenum zone to an adjacent plenum zone; the dryer comprising lateral internal membrane walls joining opposing gas permeable walls that divide the dryer into a plurality of adjacent cells, said first and second zones being connected to allow the recycling of the drying gas.

19. The dryer according to claim 18, wherein said plenums are located external to said substantially vertical elongate container.

* * * * *